March 28, 1939.  L. G. PENDER  2,152,603
SNAP FASTENER MEMBER
Filed Oct. 16, 1936
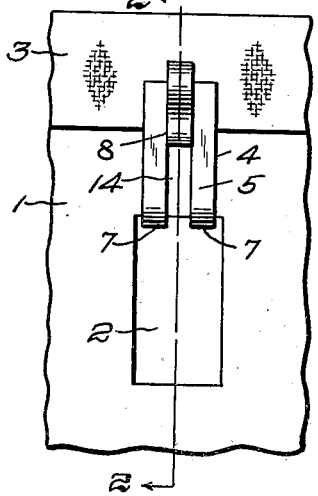
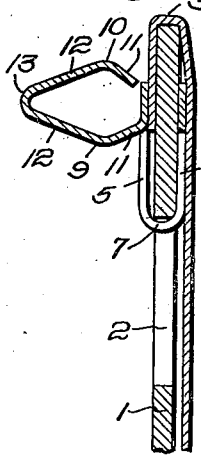
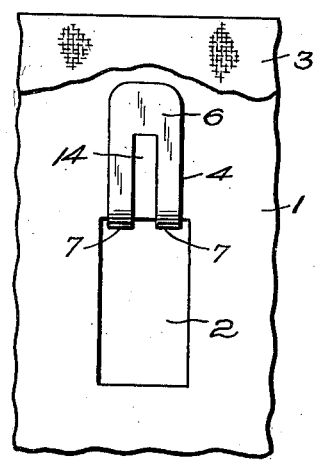
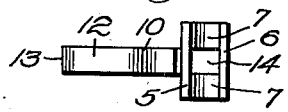
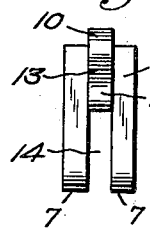
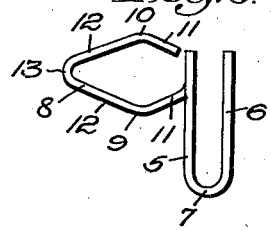
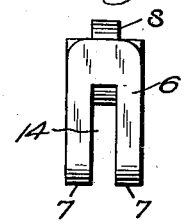
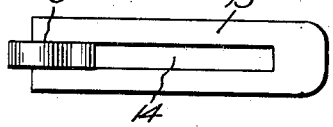
Inventor:
Lloyd G. Pender,
by Walter S. Jones
Atty.

Patented Mar. 28, 1939

2,152,603

UNITED STATES PATENT OFFICE 2,152,603

SNAP FASTENER MEMBER

Lloyd G. Pender, Detroit, Mich., assignor to United-Carr Fastener Corporation, Cambridge, Mass., a corporation of Massachusetts Application October 16, 1936, Serial No. 105,965

1 Claim. (Cl. 24—73)

My invention aims to provide improvements in snap fastener members particularly, though not exclusively, adapted for use in installations involving the upholstery of vehicle bodies and the like by means of detachably secured panels.

In the drawing, which illustrates a preferred embodiment of my invention:

Figure 1 is a rear view of an upholstery panel ready for attachment to a support and showing my improved fastener member;

Fig. 2 is a section taken along the line 2—2 of Fig. 1;

Fig. 3 is a front view of the installation shown in Figs. 1 and 2, the covering material being cut away to show the fastener member in engagement with the cardboard panel;

Fig. 4 is an end view of my fastener member per se;

Fig. 5 is a rear view of the fastener member shown in Fig. 4;

Fig. 6 is a side view of the fastener member shown in Fig. 4;

Fig. 7 is a front view of the fastener member shown in Fig. 4; and

Fig. 8 is a plan view of my improved fastener member partially formed.

Referring to the embodiment of my invention illustrated by the drawing, I have shown in Figs. 1-3 a trimming installation for automobiles and the like. In the installation herein described the structure to which my fastener member is attached comprises a backing 1 of cardboard or other similar material having a rectangular-shaped aperture 2 spaced inwardly from the periphery of the backing. The front side of the backing is covered with a suitable covering 3 which is folded over the edge and secured to the backing in a manner well known in the art (Fig. 1). A fastener member 4 is assembled with the panel providing a portion adapted for fastening engagement with a support (not shown) to which the panel is to be attached.

Referring specifically to my preferred form of fastener member, as illustrated in Figs. 4–7, I have provided a fastener which has a clip-like or U-shaped base and a socket-engaging portion extending from one side of the base. The base of the fastener comprises a pair of spaced-apart arms 5 and 6 which, in the construction illustrated, are disposed in substantially parallel relation one to another. A portion 7 connects the arms 5 and 6 and maintains them in spaced relation. A stud portion 8 extends in angular relation to the arm 5 and is preferably formed entirely from material which is cut from within the peripheries of the arms 5 and 6 and the connecting portion 7 and doubled over upon itself as most clearly shown in Fig. 2. The stud portion 8 comprises a pair of yieldable legs 9 and 10, each of which has a diverging portion 11 and a converging portion 12 providing shoulders for engagement with a cooperating apertured part. The legs 9 and 10 are connected at their leading ends forming a nose 13 for guiding the stud means into engaging relation with a socket means. The other end of the leg 9 from that connected to the leg 10 joins the material of the arm 5 of the base portion at a point spaced from the free end of the arm 5 (Fig. 2). The end of the leg 10 opposed to that connected to the leg 9 is free so as to provide proper resiliency in the stud means. Thus the stud is of a single piece connected only at one place to the base. An aperture 14 is formed in the arms 5 and 6 and the connecting portion 7 of the base of the fastener member as a result of taking material from the base for forming the stud means.

In Fig. 8 I have illustrated my snap fastener member previous to the final step in the manufacture of the same in which a strip of metal 15, from which the material has been taken to form the stud means, is bent back into substantially U-shaped formation of the completed fastener shown in Figs. 4-7.

My improved fastener stud member is preferably applied to an upholstery panel installation after the covering 3 is secured to the backing and from the rear side by inserting the arm 6 through the aperture 2 and moving the connecting portion 7 adjacent one edge of the aperture 2 so that the fastener assumes a position as shown in Figs. 1-3. The panel is now ready for attachment to the inside structure (not shown) of a motor vehicle or other frame structure.

As a result of my invention I have provided a fastener member capable of satisfactory operation in connection with an installation of the type illustrated and described and also other installations. At the same time the fastener member is particularly inexpensive to manufacture due to the minimum amount of material required for the formation of the same.

Although I have illustrated and described a preferred form of my invention, I do not wish to be limited thereby because the scope of my invention is best set forth in the following claim.

I claim:

A snap fastener of the class described comprising a base having spaced-apart, substantially parallel arms connected at one end and snap fastener means of substantially less width than the base extending from one of said arms inwardly from the end thereof, said snap fastener means having relatively thin diverging and converging leg portions formed entirely from material taken within the periphery of the arms of said base portion, one free end of one of said legs being integral with one of said arms, the other free end being connected only to the other of said legs.

LLOYD G. PENDER.